United States Patent [19]
Fujiura et al.

[11] Patent Number: 4,663,992
[45] Date of Patent: May 12, 1987

[54] CONTROL SYSTEM FOR A FOUR-WHEEL DRIVE TRANSMISSION

[75] Inventors: Kaiya Fujiura; Yoichi Hayakawa, both of Anjo; Yutaka Taga; Shinya Nakamura, both of Toyota, all of Japan

[73] Assignees: Aisin Warner Limited; Toyota Motor Corporation, both of Japan

[21] Appl. No.: 671,466

[22] Filed: Nov. 14, 1984

[30] Foreign Application Priority Data

Nov. 14, 1983 [JP] Japan .................................. 58-214649

[51] Int. Cl.$^4$ .............................................. B60K 41/04
[52] U.S. Cl. .................................... 74/869; 74/752 C; 180/247
[58] Field of Search .................. 74/869, 868, 856, 855, 74/867, 866, 752 A, 752 C; 180/247, 233

[56] References Cited

U.S. PATENT DOCUMENTS

| | | | |
|---|---|---|---|
| 4,444,073 | 4/1984 | Moroto et al. | 74/869 X |
| 4,480,505 | 11/1984 | Takano et al. | 74/868 X |
| 4,481,877 | 11/1984 | Takano et al. | 74/869 X |
| 4,485,695 | 12/1984 | Kawamoto | 74/866 X |
| 4,503,927 | 3/1985 | Hayakawa et al. | 74/752 A X |

*Primary Examiner*—Leslie Braun
*Assistant Examiner*—David Novais
*Attorney, Agent, or Firm*—Pahl, Lorusso & Loud

[57] ABSTRACT

A control system for a four-wheel drive transmission comprising a primary transmission and a transfer unit capable of establishing a high-speed four-wheel drive mode, a low-speed four-wheel drive mode and a two-wheel drive mode by the agency of friction coupling devices which are controlled selectively for engagement and disengagement by the corresponding hydraulic servomechanisms. The control system includes a source of line pressure, a manual selector valve interlocked with a shifting lever for selecting a desired drive mode, a running speed sensor which gives a signal corresponding to a running speed of the vehicle, an electronic control unit which compares the signal given by the running speed sensor with a threshold valve, decides whether or not the drive mode needs to be changed and gives an output signal, an inhibitor valve which supplies the line pressure selectively to the hydraulic servomechanisms or drains the same on the basis of a signal pressure corresponding to the output signal of the electronic control unit and the output signal pressure of the manual selector valve to establish an appropriate drive mode, and hydraulic circuits comprising valves and fluid lines. The threshold valve is selectively and optionally changeable.

7 Claims, 4 Drawing Figures

CONTROL SYSTEM FOR A FOUR-WHEEL DRIVE TRANSMISSION

BACKGROUND OF THE INVENTION (i) Field of the Invention

The present invention relates to a control system for a four-wheel drive transmission mounted on a vehicle.

(ii) Description of the Prior Art

A four-wheel drive automobile is equipped with a combination of an automotive automatic transmission including a multiratio gear unit; friction coupling devices which are operated by a hydraulic servomechanism so that the components thereof are connected to an input shaft, an output shaft or other component or selectively fixed to a fixed member; and a hydraulic control system which controls the connection of the working fluid to the hydraulic servomechanism of the friction coupling device. The automobile is further equipped with a four-wheel drive transfer unit capable of establishing either a two-wheel drive mode or a four-wheel drive mode in any of a plurality of change speed ratios (reduction ratios). Automatic change between the two-wheel drive mode, the four-wheel drive mode of a specified reduction ratio and multiratio four-wheel drive mode is achieved by selectively engaging the frictional coupling devices, such as clutches and brakes, by the hydraulic servomechanism. In a conventional four-wheel drive vehicle, however, the automatic speed change between a plurality of reduction ratios in the four-wheel drive running mode is controlled by the governor pressure which is regulated by a governor valve as an input pressure relating to the running speed, and hence the set speeds for speed change can not be optionally changed and any variation of the governor pressure causes variation of the set speeds.

SUMMARY OF THE INVENTION

Accordingly, it is an object of the present invention to provide a control system for a four-wheel drive transmission, capable of optionally changing the set speed for automatic speed change between a plurality of reduction ratios in the four-wheel drive running mode and of ensuring accurate automatic speed change at the set speed.

The present invention provides a control system for a four-wheel drive transmission having a transfer unit capable of being changed between a high-speed drive mode and a low-speed drive mode by means of frictional coupling devices; comprising:

a source of hydraulic pressure;

a running speed sensor;

control means which receives a signal given by the running speed sensor and generates a fluid pressure corresponding to a running speed of the vehicle;

hydraulic servomechanisms which control the frictional coupling devices for engagement and disengagement; and an inhibitor valve which is controlled by the pressure corresponding to the running speed of the vehicle and given by the control means so as to supply selectively the hydraulic pressure generated by the source of hydraulic pressure to the hydraulic servomechanisms.

The present invention further provides a control system for a four-wheel drive transmission having a primary transmission and a transfer unit capable of being changed between a high-speed drive mode and a low-speed drive mode by means of frictional coupling devices; comprising:

a source of hydraulic pressure;

a manual valve interlocked with a manual shifting lever which distributes the hydraulic pressure generated by the source of hydraulic pressure according to the selection of a drive mode from among a plurality of drive modes by means of the manual shifting lever;

a running speed sensor;

control means which receives a signal given by the running speed sensor and generates a fluid pressure corresponding to the running speed of the vehicle;

hydraulic servomechanisms which control the frictional coupling devices for engagement and disengagement; and an inhibitor valve which is controlled by the output fluid pressure of the manual valve and the pressure given by the control means in accordance with the running speed of the vehicle to supply the hydraulic pressure generated by the source of hydraulic pressure selectively to the hydraulic servomechanisms.

The present invention moreover provides a control system for a four-wheel drive transmission having a primary transmission, a transmission connected to the output shaft of the primary transmission and having friction coupling devices to establish a high-speed drive mode and friction coupling devices to establish a low-speed drive mode, the output shaft of the transmission, a second output shaft and a transfer unit capable of transmitting power from the output shaft of the transmission to the second output shaft and having friction coupling devices to change over between the two-wheel drive mode and the four-wheel drive mode; comprising:

a source of hydraulic pressure:

a manual valve interlocked with a manual shifting lever;

a running speed sensor;

control means which receives the output signal of the running speed sensor and generates a fluid pressure corresponding to the running speed of the vehicle;

hydraulic servomechanisms for high-speed drive which control the friction coupling devices for engaging and disengaging the high-speed drive;

hydraulic servomechanisms for low-speed drive which control the friction coupling devices for engaging and disengaging the low-speed drive;

hydraulic servomechanisms for changing over between the two-wheel drive mode and the four-wheel drive mode by selective engagement and disengagement of the friction coupling devices; and an inhibitor valve;

wherein the manual valve has a first position for supplying the fluid pressure of the source of hydraulic pressure to the inhibitor valve, a second position for supplying the fluid pressure of the source of hydraulic pressure both to the hydraulic servomechanisms for changing over between the two-wheel drive mode and the four-wheel drive mode and to the inhibitor valve and a third position for supplying the fluid pressure of the source of hydraulic pressure to the hydraulic servomechanisms for changing over between the two-wheel drive mode and the four-wheel drive mode;

the inhibitor valve is controlled by the fluid pressure supplied thereto from the manual valve when the manual valve is in the first position or in the second position so as to supply the fluid pressure of the source of hydraulic pressure to the servomechanisms for establishing the high-speed drive mode; and the inhibitor valve is controlled by fluid pressure corresponding to the running speed of the vehicle when the manual valve is in the third position so as to supply the fluid pressure of the source of hydraulic pressure selectively to the hydraulic servomechanisms for establishing the high-speed drive mode or the low-speed drive mode.

Thus, the control system for a four-wheel drive transmission according to the present invention is capable of readily establishing a speed in the four-wheel drive mode for a plurality of different reduction ratios and of achieving automatic reduction ratio change at a set speed.

DETAILED DESCRIPTION OF THE INVENTION

Figure 1:
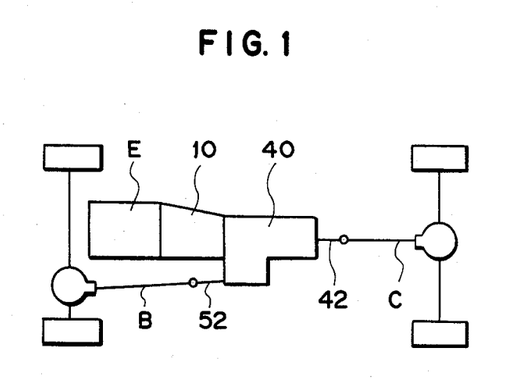
FIG. 1 is a schematic illustration of the driving mechanism of a four-wheel drive automobile.
Figure 2:
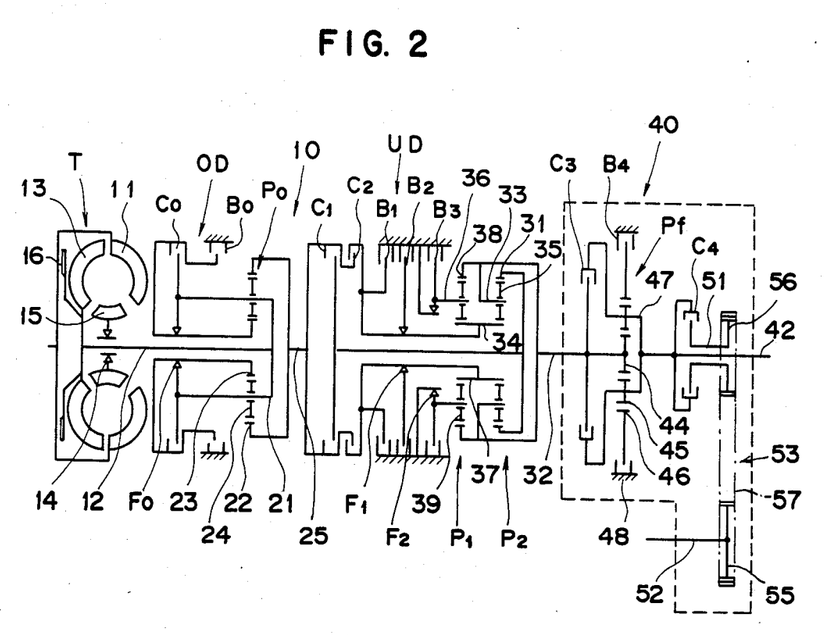
FIG. 2 is a diagrammatic illustration of a four-wheel drive automatic transmission.

FIGS. 1 and 2 show a general arrangement of a four-wheel drive automatic transmission and the mechanisms of the four-wheel drive automatic transmission respectively. In FIGS. 1 and 2, indicated at 10 is a four-speed automatic transmission with an overdrive, i.e., a primary transmission, and a four-wheel drive transfer unit 40, i.e., a secondary transmission, connected to the output shaft 32 of the four-speed automatic transmission 10. The four-wheel drive transfer unit 40 is attached to the four-speed automatic transmission 10 mounted on the engine E. The first output shaft 42 and the second output shaft 52 of the four-wheel drive transfer unit are connected to the rear propeller shaft C for driving rear wheels and to the front propeller shaft B for driving front wheels respectively.

The four-speed automatic transmission 10 has a fluid torque convertor T, an overdrive mechanism OD and an underdrive mechanism UD with three forward speeds and reverse.

The torque converter T comprises a pump 11 connected to the output shaft of the engine E, an output shaft 12, a turbine 13 connected to the output shaft 12, a stator 15 connected through a one-way clutch 14 to a fixed part and a direct coupling clutch 16. The output shaft 12 of the torque converter T serves also as the input shaft of the overdrive mechanism OD.

The overdrive mechanism OD comprises a multiple disk clutch $C_0$, a multiple disk brake $B_0$, both being frictional coupling devices, a one-way clutch $F_0$ and a planetary gear $P_0$ which is controlled through the selective actions of those frictional coupling devices so that the components thereof are fixed to a fixed member such as the transmission case, connected to the input shaft, the output shaft or other component, or released or disengaged from those components.

The planetary gear $P_0$ comprises a carrier 21 connected to the input shaft 12, a ring gear 22 connected to the output shaft 25 of the overdrive mechanism OD, a sun gear 23 mounted rotatably on the input shaft 12, adapted to be fixed to the transmission case by the brake $B_0$ and connected through the clutch $C_0$ and the one-way clutch $F_0$ disposed in parallel to the clutch $C_0$ to the carrier 21 and planet pinions 24 supported rotatably on the carrier 21 and engaging the sungear 23 and the ring gear 22.

The output shaft 25 of the overdrive mechanism OD serves also as the input shaft of the three-forward-speed and reverse underdrive mechanism UD.

The under drive mechanism UD comprises multiple disk clutches $C_1$ and $C_2$, multiple disk brakes $B_1$, $B_2$ and $B_3$, each of $C_1$, $C_2$, $B_1$, $B_2$ and $B_3$ being a frictional coupling device, one-way clutches $F_1$ and $F_2$, a front planetary gear $P_1$ and a rear planetary gear $P_2$.

The rear planetary gear $P_2$ comprises a ring gear 31 connected through the clutch $C_1$ to the input shaft 25, a carrier 33 connected to the output shaft 32 of the underdrive mechanism UD, a sun gear 34 connected through the clutch $C_2$ to the input shaft 25 and through the brake $B_1$ to the transmission case, a brake $B_2$ disposed in parallel to the brake $B_1$ and a one-way clutch $F_1$ disposed in series with the brake $B_2$ for locking to the transmission case and planet pinions 35 supported rotatably on the carrier 33 and engaging the sun gear 34 and the ring gear 31.

The front planetary gear $P_1$ comprises a carrier 36 adapted to be fixed to the transmission case through the brake $B_3$ and a one-way clutch $F_2$ disposed in parallel with the brake $B_3$, a sun gear 37 formed integrally with the sun gear 34 of the rear planetary gear $P_2$, a ring gear 38 secured to the output shaft 32 and planetary pinions 39 supported rotatably on the carrier 36 and engaging the sun gear 37 and the ring gear 38.

Figure 3:
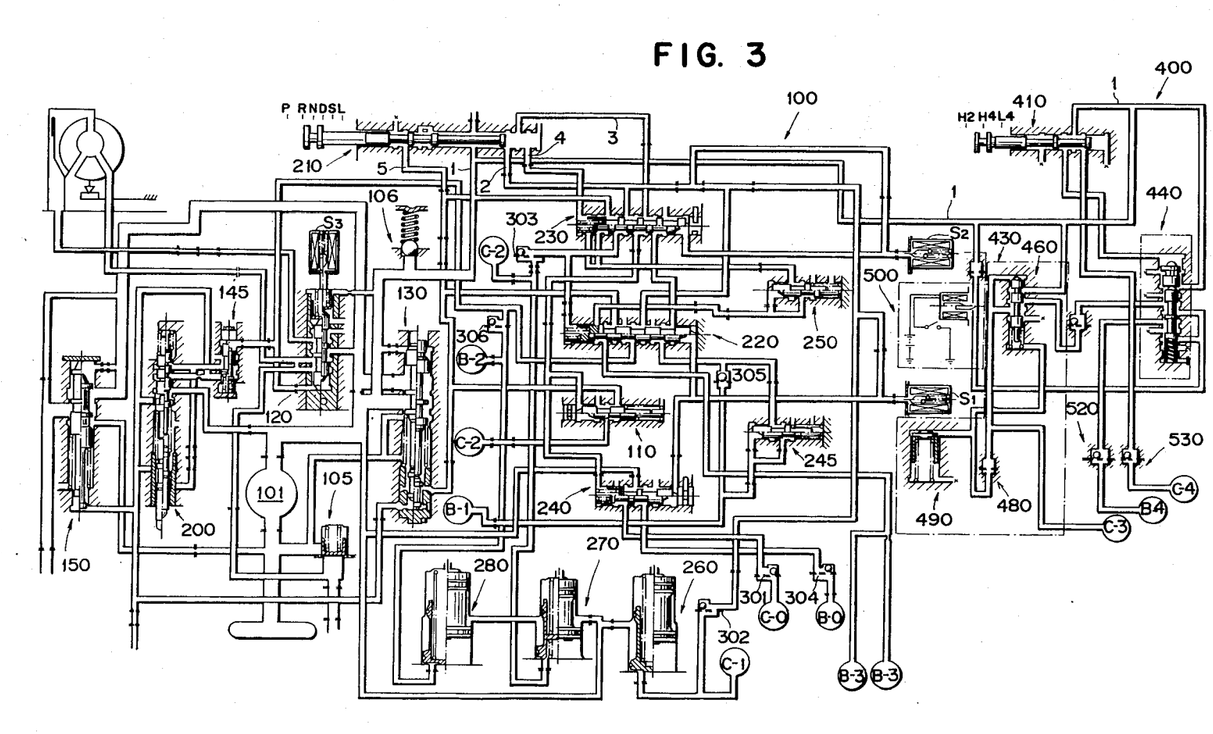
FIG. 3 is a circuit diagram of the hydraulic control circuit of a hydraulic control system for a four-wheel drive automatic transfer unit.

This four-wheel drive automatic transmission is controlled by a four-speed automatic transmission hydraulic control system 100 shown in FIG. 3 for the automatic speed change of four-forward speed including overdrive speed O/D and the manual speed change of reverse through the selective engagement and disengagement of the friction coupling devices, namely, the clutches and the brakes, according to the degree of throttle opening, the running speed of the vehicle and other running conditions.

The shifting lever, not shown, provided nearby the driver's seat for controlling the manual valve of the hydraulic control system has shifting positions SPs corresponding to the parking range P, reverse range R, neutral range N, drive range D, second range S and low range L. The actions of the clutches and the brakes for the shifting positions SPs and the fourth speed (4), third speed (3), second speed (2) and first speed (1) are tabulated in Table 1, where a mark "O" indicates the engagement of the frictional coupling device, a mark "X" indicates the disengagement of the same, characters F (free) and L (lock) designate the free rotation and the locking of the one-way clutch respectively.

TABLE 1

| SP | | Clutches | | | Brakes | | | One-way Clutches | | |
|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ |
| P | | O | X | X | X | X | X | X | | | |
| R | | O | X | O | X | X | X | O | L | F | F |
| N | | O | X | X | X | X | X | X | | | |
| D | 1 | O | O | X | X | X | X | X | L | F | L |
| | 2 | O | O | X | X | X | O | X | L | L | F |
| | 3 | O | O | O | X | X | O | X | L | F | F |
| | 4 | X | O | O | O | X | O | X | F | F | F |

TABLE 1-continued

| | | Clutches | | | Brakes | | | One-way Clutches | | |
|---|---|---|---|---|---|---|---|---|---|---|
| SP | | $C_0$ | $C_1$ | $C_2$ | $B_0$ | $B_1$ | $B_2$ | $B_3$ | $F_0$ | $F_1$ | $F_2$ |
| S | 1 | O | O | X | X | X | X | X | L | F | L |
|   | 2 | O | O | X | X | O | O | X | L | L | F |
|   | 3 | O | O | O | X | X | O | X | L | F | F |
| L | 1 | O | O | X | X | X | X | O | L | F | L |
|   | 2 | O | O | X | X | O | O | X | L | L | F |

The hydraulic control system 100 of the four-speed automatic transmission 10 includes a hydraulic pump 101, a pressure regulating valve 130, a second pressure regulating valve 150, a cooler by-pass valve 105, a pressure relief valve 106, a reverse clutch sequence valve 110, throttle pressure valve 200 which generates a throttle pressure corresponding to the degree of opening of the throttle valve, a cutback valve 145, a direct coupling clutch control valve 120, a manual valve 210, a 1-2 shift valve 220, a 2-3 shift valve 230, a 3-4 shift valve 240, a solenoid valve $S_1$ for controlling the 1-2 shift valve 220 and the 3-4 shift valve 240, a solenlid valve $S_2$ for controlling the 2-3 shift valve 230, a solenoid valve $S_3$ for controlling the direct coupling clutch control valve 120, an intermediate coasting modulator valve 245 for regulating the pressure which is supplied to the brake $B_1$, a low coasting modulator valve 250 for regulating the pressure which is supplied to the brake $B_3$, an accumulator 260 for the clutch $C_1$, an accumulator 270 for the clutch $C_2$, an accumulator 280 for the brake $B_2$, flow control valves with check valves 301, 302, 303, 304, 305 and 306 for controlling the flow rate of the working fluid supplied to the respective hydraulic servomechanisms of the clutches $C_0$, $C_1$ and $C_2$ and brakes $B_0$, $B_1$ and $B_2$ and a network of pipes and tubes suitably interconnecting the respective hydraulic servomechanisms B-0, B-1, B-2 and B-3 of the brakes $B_0$, $B_1$, $B_2$ and $B_3$, the respective hydraulic servomechanisms C-0, C-1 and C-2 of the clutches $C_0$, $C_1$ and $C_2$ and the hydraulic cylinders of the clutches and brakes. The solenoid valves $S_1$, $S_2$ and $S_3$ are controlled by an electronic control unit, not shown, so as to be opened or closed according to the running conditions of the vehicle, such as the running speed and the engine load for controlling the 1-2 shift valve, 2-3 shift valve, 3-4 shift valve and the direct coupling clutch control valve. These shift valves selectively interconnect the hydraulic servomechanisms of the clutches and the brakes and the source of pressure according to the set position of the manual valve 210.

The manual valve 210 is interlocked with the shifting lever provided by the driver's seat and is shifted by the manual operation of the shifting lever according to the range selected by the shifting lever to the position P (parking), R (reverse drive), N (neutral), D (drive), S (second speed) or L (low speed).

Table 2 shows the status of connection of fluid lines 2 to 5 to the fluid line 1 for the positions of the shifting lever, in which a symbol "O" indicates the connection of the fluid line to the fluid line 1 and supply of the line pressure to the same, while a symbol "X" indicates that the fluid line is drained.

TABLE 2

| | P | R | N | D | S | L |
|---|---|---|---|---|---|---|
| Fluid line 2 | X | X | X | O | O | O |
| Fluid line 3 | X | X | X | X | O | O |
| Fluid line 4 | X | X | X | X | X | O |
| Fluid line 5 | X | O | X | X | X | X |

Figure 4:
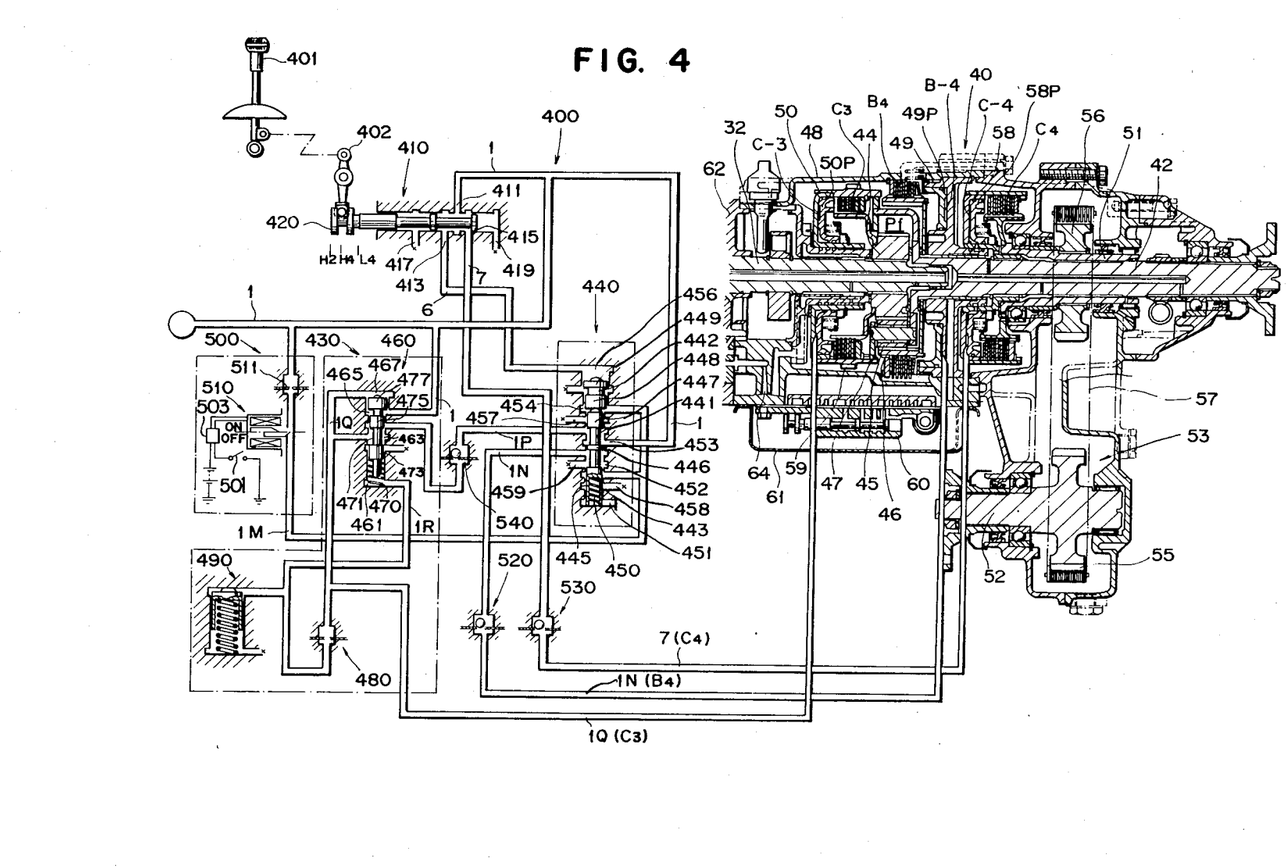
FIG. 4 is a combined representation of a sectional view of a four-wheel drive transfer unit and a hydraulic control system according to the present invention for the four-wheel drive transfer unit.

Referring to FIG. 2, the transfer unit 40 comprises: friction coupling devices, namely, a clutch $C_3$, a brake $B_4$ and clutch $C_4$, the output shaft 32 of the planetary gear $P_1$ and $P_2$ as an input shaft (32), a first output shaft 42 of the transfer unit disposed coaxially with the input shaft 32, a planetary gear $P_f$ disposed between the input shaft 32 and the first output shaft 42, a four-wheel drive sleeve 51 mounted rotatably on the first output shaft 42, a second output shaft 52 extended in parallel to and opposite to the first output shaft 42 and a power train 53 operatively interconnecting the sleeve 51 and the second output shaft 52. The planetary gear $P_f$ includes a sun gear 44 mounted on the end of the input shaft 32, planet pinions 45 engaging the sun gear 44, a ring gear 46 engaging the planet pinions 45 and a carrier 47 rotatably supporting the planet pinions 45 and joined to the front end of the first output shaft 42 of the transfer unit. In this embodiment, as shown in FIG. 4, the brake $B_4$ is multiple disk friction brake for engaging the ring gear 46 and the transfer case 48. The brake $B_4$ is operated by a hydraulic servomechanism B-4 constituted of a cylinder 49 formed in the transfer case 48 and a piston 49P fitted in the cylinder 49. The clutch $C_3$ is disposed on the side of the automatic transmission 10 with respect to the planetary gear $P_f$ to engage and disengage the sun gear 44 and the carrier 47. The clutch $C_3$ is operated by a hydraulic servomechanism C-3 consisting of a cylinder 50 joined to the carrier 47 and a piston 50P fitted in the cylinder 50. The clutch $C_4$ is a multiple disk friction clutch for connecting and disconnecting the first output shaft 42 connected to the carrier 47 and a sleeve 51 connected to one sprocket 56 of the power train 53 for driving the second output shaft 52 of the transfer. The clutch $C_4$ is operated by a hydraulic servomechanism C-4 comprising a cylinder 58 rotatably supported on the transfer case 48 and a piston 58P fitted in the cylinder 58. The power train 53 comprises the sprocket 56 splined to the sleeve 51, a sprocket 55 formed integrally with the second output shaft 52 and a chain 57 extended between these sprockets.

A parking gear 59 is formed on the outer circumference of the cylinder 50 of the hydraulic servomechanism C-3. With the shifting lever of the automatic transmission at the position P for parking, a retaining pawl, not shown, engages the gear 59 to fix the first output shaft 42.

Indicated at 60 is a valve body provided with a hydraulic control unit which supplies a pressure to or drain the hydraulic servomechanisms C-3, C-4 and B-4 of the clutch $C_3$, the clutch $C_4$ and the brake $B_4$ of the four-wheel drive transfer 40. Indicated at 61 is an oil pan. The working fluid to be supplied to the hydraulic servomechanisms C-3, C-4 and B-4 of the clutches $C_3$ and $C_4$ and the brake $B_4$ respectively are to the transfer valve body 60 provided with a transfer control unit 400 through a fluid passage 64 formed in the transmission case 62 and the transfer 48.

In the ordinary running condition, the line pressure supplied to the hydraulic control system of the automatic transmission is supplied to the hydraulic servomechanism C-3 to engage the clutch $C_3$, while the hydraulic servomechanism B-4 and C-4 are drained to disengage the brake $B_4$ and the clutch $C_4$. Consequently, the sungear 44 and the carrier 47 of the planetary gear $P_f$ are coupled, and thereby the power is transmitted from the input shaft 32 to the first output shaft 42 for driving the rear wheels at a reduction ratio of 1 to establish the two-wheel drive mode in which the vehicle is driven only by the rear wheels. In this state, since the power is transmitted from the input shaft 32 to the first output shaft 42 through the clutch C₃ and the carrier 47 without using the sungear 44, the planetary pinions 45 and the ring gear 46, no load is applied to the teeth of those gears, which extends the life of the gears. When it is required to change from two-wheel drive running into four-wheel drive running during two-wheel drive running, the shifting lever 401 disposed near the driver's seat is manually operated accordingly so that the line pressure is supplied to the hydraulic servomechanism C-4 of the transfer control unit 400 to engage the clutch smoothly. Then, the first output shaft 42 and the sleeve 51 are joined fixedly and thereby the power is transmitted through the power train 53, the second output shaft 52 and the propeller shaft B (FIG. 1) also to the front wheels. Thus, the power is transmitted from the input shaft 32 at a reduction ratio of 1 (one) both to the first output shaft 42 for driving the rear wheels and to the second output shaft 52 for driving the front wheels to establish the direct four-wheel drive running mode (high-speed four-wheel drive mode). If the output torque needs to be increased to climb up a steep slope during four-wheel drive running, the shifting lever 401 is manually operated accordingly. Then, the line pressure actuates the inhibitor valve 440, i.e., a changeover valve for selecting the high-speed four-wheel drive mode or the low-speed four-wheel drive mode, to supply the line pressure gradually to the hydraulic servomechanism B-4 and to drain the hydraulic servomechanism C-3 at an appropriate timing so that the brake B₄ is engaged gradually and the clutch C₃ is disengaged smoothly. Consequently, the sun gear 44 is disconnected from the carrier 47 and the ring gear 46 is fixed, and thereby the power is transmitted through the input shaft 32, the sun gear 44, the planet pinions 45 and the carrier 47 at a higher reduction ratio to the first output shaft 42 and the second output shaft 52 to establish a low-speed four-wheel drive running mode (low-speed four-wheel drive mode). Table 3 shows the conditions of the brake B₄ and the clutch C₃ and the running mode of the vehicle for the ranges of the transfer unit selected manually.

TABLE 3

| Manual Shift Running Modes Selected Range | | Friction Coupling Devices | | | Reduction Ratio (Examples) |
|---|---|---|---|---|---|
| | | C₃ | B₄ | C₄ | |
| H₂ | Direct two-wheel drive | O | X | X | 1 |
| H₄ | Direct four-wheel drive | O | X | O | 1 |
| L₄ | Direct four-wheel drive | O | X | O | 1 |
| L₄ | Indirect four-wheel drive | X | O | O | 3.0 |

In Table 3, symbols "O" and "X" indicate engagement and disengagement respectively. An exemplary reduction ratio 3.0 shown in Table 3 was calculated by substituting $\gamma=0.5$ into a formula: Reduction ratio $=(1+\gamma)/\gamma$, where $\gamma$ is the gear ratio of the ring gear 46 to the sun gear 44 by way of example.

The transfer control unit 400 of the four-wheel drive transfer comprises: a transfer manual valve 410 connected through a linkage 402 to the shifting lever 401 provided by the driver's seat, the inhibitor valve 440 for changing over between the high-speed (direct) four-wheel drive mode and the low-speed (indirect) four-wheel drive mode during the four-wheel drive operation and an up-shift timing mechanism 430. The up-shift timing mechanism 430 includes an accumulator control valve 460, an accumulator 490 and a restrictor 480 and is interposed between the inhibitor valve 440 and the hydraulic servomechanism C-3 to control the timing of up-shifting operation (L₄ to H₄). The transfer control unit 400 further includes a transfer automatic control mechanism 500 for regulating the input fluid pressure (a pressure corresponding to the running speed of the vehicle) of the inhibitor valve 440 prevailing within the fluid line 1M communicating with the fluid line 1 to achieve the automatic changeover between the high-speed four-wheel drive mode and the low-speed four-wheel drive mode. Also, included within the transfer control unit 400 are a restrictor with check valve 520 provided in the fluid line 1N for supplying the working fluid to and draining the hydraulic servomechanism B-4, a restrictor with check valve 530 provided in the fluid line 7 for supplying the working fluid to and draining the hydraulic servomechanism C-4 and a restrictor with check valve 540 provided in the fluid line 1P interconnecting the inhibitor valve 440 and the up-shift timing mechanism 430.

The transfer manual valve 410 has a spool 420 interlocked with the shifting lever 401 provided by the driver's seat through the linkage 402, an inlet port 411 communicating with the line pressure supply fluid line 1 of the hydraulic control circuit of the four-wheel drive automatic transmission, an outlet port 413 communicating with the fluid line 6, an outlet port 415 communicating with the fluid line 7 and drain ports 417 and 419. When the two-wheel drive mode (H₂ mode) is selected, the spool 420 is shifted so that the fluid lines 1 and 6 are interconnected and the drain port 419 is connected to the fluid line 7. When the four-wheel drive mode (H₄ mode) is selected, the spool is shifted so that the fluid lines 1, 6 and 7 are interconnected as depicted in FIG. 4. When the low-speed four-wheel drive mode (L₄ mode) is selected, the fluid lines 1 and 7 are interconnected and the fluid line 6 is connected to the drain port 417.

The inhibitor valve 440 has a spool 441 urged upward, as viewed in FIG. 3 or 4, by a spring 450 and a plunger 442 disposed coaxially with the spool 441. The spool 441 has a bottom land 445 which is contiguous with the spring 450, a middle land 446 and a top land 447, which are the same in diameter. The plunger 442 has a bottom land 448 of a diameter greater than that of the land of the spool 441 and a top land 449 of a diameter greater than that of the bottom land 448. The spool 441 and the plunger 442 define a bottom chamber 451, a first intermediate chamber 452 between the bottom land 445 and the middle land 446, a second intermediate chamber 453 between the middle land 446 and the top land 447, a chamber 454 between the spool 441 and the plunger 442 and a top chamber 456.

When the spool 441 of the inhibitor valve 440 is shifted to the upper position, as viewed in the drawing, the bottom chamber 451 communicates with the running speed signal pressure fluid line 1M by via a port 443, the line pressure fluid line 1 and the reduction fluid line 1N communicate by means of the first intermediate chamber 452 and the second intermediate chamber 453 connects the direct coupling fluid line 1P to the drain port 457. When the spool 441 is shifted to the lower position, as shown in FIG. 4, the chamber 451 is connected via the port 443 to the drain port 458, the first intermediate chamber 452 interconnects the reduction fluid line 1N and the drain port 459 and the second intermediate chamber 453 interconnects the line pressure fluid line 1 and the direct coupling fluid line 1P. The chamber 454 always communicates with the fluid line 1M, in which a fluid pressure is generated corresponding to the running speed of the vehicle, and the top chamber 456 always communicates with the fluid line 6.

The accumulator control valve 460 has a spool 471 urged upward, as viewed in the drawing, by a spring 470. The spool 471 has a bottom land 473 and a middle land 475 of the same diameter and a top land 477 of a diameter greater than that of the bottom and the middle lands 473 and 475. The spool 471 defines, from bottom upward as viewed in the drawing, a bottom chamber 461, intermediate chambers 463 and 465 and a top chamber 467.

As regards the connection of the accumulator control valve 460 to the hydraulic control circuit, the lower intermediate chamber 463 communicates always with the fluid line 1Q connected to the hydraulic servomechanism C-3 and the upper intermediate chamber 465 communicates always with the line pressure fluid line 1. The pressure generated in the fluid line 1Q is fed back to the top chamber 467 and the pressure generated in the fluid line 1R communicating with the fluid line 1Q is supplied through the restrictor 480 and the accumulator 490 to the bottom chamber 461.

The transfer automatic control mechanism 500 has a running speed sensor 501, an electronic control unit 503 which receives the output signal of the running speed sensor 501 as an input signal, a restrictor 511 provided in the fluid line 1M communicating with the fluid line 1 and a solenoid valve 510 which is controlled by the output signal of the electronic control unit 503 for opening and closing operations. When the running speed of the vehicle is higher than a predetermined value, for example, 20 Km/hr, the solenoid of the solenoid valve 510 is de-energized to supply the line pressure of the fluid line 1 to the fluid line 1M. When the running speed is lower than the predetermined value, the solenoid of the solenoid valve 510 is energized to drain the fluid line 1M. Thus a fluid pressure connected with the running speed of the vehicle is produced in the fluid line 1M. It is possible, for instance, to design the electronic control unit 503 controlling the solenoid valve 510 on the basis of the input signal given thereto by the running speed sensor so that the predetermined value can readily be changed. Accordingly, the transfer automatic control mechanism 500 is readily adaptable for the optional selection of the predetermined value by the driver of the vehicle according to road conditions and the running conditions of the vehicle.

The line pressure is supplied via the fluid line 1 to the chamber 465. The fluid line 7 is connected through a restrictor 530 to the hydraulic servomechanism C-4.

The functions of the transfer unit for the positions of the transfer manual valve will be described hereinafter.

(a) The transfer manual valve is shifted to the $H_2$ position: Since the fluid line 7 is drained, no power is transmitted to the sleeve 51, and hence the two-wheel drive mode is maintained. The line pressure is supplied to the fluid line 6 to shift the spool 441 and the plunger 442 of the inhibitor valve 440 downward, as viewed in the drawing, to the lower position and the fluid line 1N is drained through the drain port 459, and thereby the brake $B_4$ and the clutch $C_4$ are disengaged. The fluid line 1P is connected to the fluid line 1 and to the fluid line 1Q via the restrictor with check valve 540 and the accumulator control valve 460 to engage the clutch $C_3$. Consequently, the transfer unit 40 is shifted to the $H_2$ mode (two-wheel drive mode).

(b) The transfer manual valve is shifted to the $H_4$ position: The line pressure is supplied both to the fluid line 6 and to the fluid line 7. The line pressure supplied to the fluid line 6 fixes the spool 441 and the plunger 442 of the inhibitor valve 440 at the lower position, while the line pressure supplied to the fluid line 7 engages the clutch $C_4$. Then, the transfer unit 40 is shifted to the $H_4$ mode (direct four-wheel drive mode).

(c) The transfer manual valve is shifted to the $L_4$ position: The fluid line 6 is drained and the line pressure is supplied to the fluid line 7. Then, the clutch $C_4$ is engaged and the direct four-wheel drive mode is maintained. When the transfer manual valve is shifted to the $L_4$ position while the running speed is higher than the predetermined value and the solenoid valve 510 is closed, the line pressure is supplied to the fluid line 1M. Accordingly, the spool 441 of the inhibitor valve 440 is kept at the lower position by the line pressure applied to the chamber 454, and hence the transmission is prevented from speed change to restrict overrunning of the engine.

When the transfer manual valve is shifted to the $L_4$ position with the running speed being lower than the predetermined valve and the solenoid valve open, or when the running speed is reduced from a running speed higher than the predetermined value to a running speed below the predetermined value while the vehicle is running with the transfer manual valve being shifted to the $L_4$ position and the solenoid valve 510 being closed, the solenoid valve 510 is opened and the fluid line 1M is drained. Consequently, the spool 441 is shifted to the upper position by the agency of the spring 450, and thereby the fluid passage 1N is connected to the fluid line 1, the working fluid is supplied to the hydraulic servomechanism B-4 and the fluid passage 1P is drained through the drain port 457 to drain the hydraulic servomechanism C-3 of the clutch $C_3$. Therefore, the transfer unit is shifted to the low-speed four-wheel drive mode. When the transfer unit is shifted once to the low-speed four-wheel drive mode, the low-speed four-wheel drive mode is maintained even if the running speed increases above the predetermined value and the solenoid valve 510 is closed after the low-speed four-wheel drive mode has been established, because the line pressure supplied to the fluid line 1M is applied to the chamber 454 of the inhibitor valve 440 and also to the bottom chamber 451 through the port 443 formed in the land of the spool 441 and hence the spool 441 is held at the same position to maintain the low-speed four-wheel drive mode.

What is claimed is:

1. A control system for a four-wheel drive transmission having friction coupling devices for establishing two-wheel drive, four-wheel low-speed drive and four-wheel high-speed drive modes and hydraulic servomechanisms for operation of said friction coupling devices, said control system comprising:
   a source providing hydraulic line pressure to a plurality of fluid lines for operation of said hydraulic servomechanisms;
   shift valve means, interposed in said fluid lines between said source and said hydraulic servomechanisms, for controlling said hydraulic servomechanisms to selectively establish a two-wheel drive, high-speed four-wheel drive or low-speed four-wheel drive mode;

sensor means for sensing vehicle speed and generating an electrical signal representative of same;

a solenoid valve, operated responsive to said electrical signal and interposed in a first of said plural fluid lines, said solenoid valve being energized at sensed vehicle speeds below a predetermined value to regulate the pressure within said first fluid line and de-energized at speeds higher than a predetermined value to assume a position allowing hydraulic fluid line pressure to be communicated from said source through said first fluid line; and inhibitor valve means, in fluid communication with said solenoid valve through said first fluid line and interposed in at least a second fluid line between said shift valve means and one of the hydraulic servomechanisms, for preventing shifting to the low-speed four-wheel drive mode when the pressure in said first fluid line corresponds to a sensed vehicle speed above a predetermined value and for preventing shifting between low-speed and high-speed four-wheel drive modes when said hydraulic line pressure is received through said first fluid line.

2. A control system in accordance with claim 1 wherein said control system comprises a manual shift lever mechanically linked to said shift valve means.

3. A control system for a four-wheel drive transmission having a primary transmission and a transfer unit, said transfer unit being adapted for manual shifting between a high-speed drive mode and a low-speed drive mode through frictional coupling devices, said control system comprising:

a manual shift lever;

a source of hydraulic line pressure;

a manual valve mechanically interlocked with said manual shift lever for distributing the hydraulic line pressure generated by the source of hydraulic pressure according to the manual selection, by operation of said manual shift lever, of either a first drive range or a second drive range;

a vehicle speed sensor;

automatic control means for receiving an input signal from said vehicle speed sensor and for generating a fluid pressure corresponding to the speed of the vehicle;

hydraulic servomechanisms for moving the frictional coupling devices into and out of engagement;

an inhibitor valve which is controlled, responsive to (1) the hydraulic line pressure received through said manual valve and (2) the fluid pressure output of the automatic control means corresponding to the speed of the vehicle, to selectively supply the hydraulic line pressure to the hydraulic servomechanisms; and a first fluid line connecting said manual valve and said inhibitor valve;

said manual valve having at least one drain port and a manually shiftable first spool, said first spool allowing said hydraulic line pressure to enter said first fluid line when the manual shift lever is moved to the first drive range and connecting first fluid line with said drain port when the manual shift lever is moved to the second drive range;

said automatic control means including:

a second fluid line connecting said inhibitor valve and said source of hydraulic line pressure;

a restrictor provided in said second fluid line;

a solenoid valve provided in said second fluid line, between the inhibitor valve and the restrictor, said solenoid valve draining the hydraulic pressure from said second fluid line when energized and allowing hydraulic line pressure to pass through said second fluid line when de-energized;

an electronic control unit which receives the input signal given by the vehicle speed sensor and generates an output signal to energize the solenoid valve when the input signal corresponds to a vehicle speed lower than a predetermined value and to de-energize the solenoid valve when the input signal corresponds to a vehicle speed higher than a predetermined value;

said inhibitor valve including:

a second spool movable between a first spool position at which a low-speed drive mode is established and a second spool position at which a high-speed drive mode is established;

biasing means for urging said second spool toward said first position;

a first chamber connected to said first fluid line to shift said second spool to said second spool position against said biasing means responsive to receipt of hydraulic line pressure supplied through said first fluid line when said manual valve is shifted to said first drive range;

an intermediate chamber which is connected to said second fluid line to shift said second spool to said second spool position against said biasing means responsive to a hydraulic pressure received through said second fluid line corresponding to a vehicle speed higher than a predetermined value; and a second chamber which is connected to said second fluid line when said second spool is in said first spool position.

4. A control system according to claim 3, wherein said inhibitor valve further includes a plunger disposed within said inhibitor valve coaxially with said second spool, said plunger being movable between a first plunger position and a second plunger position and serving to force said second spool to the second spool position when itself is moved to the second plunger position, said second spool and said plunger being urged to their respective second positions responsive to line pressure received through said manual valve and said second spool being moved to its second position responsive to pressure received in said intermediate chamber through said second fluid line.

5. A control system according to claim 4 wherein:

said second spool has first and second lands of equal diameter;

said plunger has first and second lands, said second land of said plunger being located adjacent said second spool and having a diameter less than that of said first land of said plunger;

said first chamber is defined by said first land of said plunger;

said second chamber is defined by said second land of said second spool; and said intermediate chamber is defined between said first land of said second spool and said second land of said plunger;

whereby:

when said manual shift lever is moved to said second drive range, thereby draining said first fluid line, while said vehicle speed is higher than a predetermined valve, said intermediate chamber receives said line pressure through said second fluid line thereby maintaining said second spool in said second spool position;

when said manual shift lever is moved to said second drive range, thereby draining said first fluid line, while said vehicle speed is lower than a predetermined value with said solenoid valve draining pressure from said second fluid line, said second spool is moved to said first spool position by said biasing means; and when said solenoid valve is de-energized, while said second spool is in said second spool position with said first chamber receiving hydraulic line pressure through said first fluid line and said high-speed drive mode is thereby established, hydraulic line pressure is supplied through said second fluid line to both of said second and intermediate chambers thereby maintaining said second spool in said second spool position and maintaining said high-speed drive mode.

6. A control system according to claim 5 wherein said inhibitor valve further includes a drain and said second land of said second spool has a hollow, said hollow opening into said second chamber, and a radial port in communication with said hollow whereby fluid communication is established through said port (1) between said second chamber and said second fluid line when said second spool is in said first spool position and (2) between said second chamber and said drain when said second spool is in said second spool position.

7. A control system for a four-wheel drive transmission having a primary transmission and a secondary transmission connected to an output shaft of the primary transmission and having friction coupling devices for establishing a high-speed four-wheel drive mode and for establishing a low-speed four-wheel drive mode, said secondary transmission having first and second output shafts and a power train transfer capable of transmitting power from the first output shaft of the secondary transmission to the second output shaft of the secondary transmission through change-over friction coupling means for changing over between two-wheel drive and four-wheel drive modes, said control system comprising:

a source of hydraulic line pressure;
a manual shifting lever;
a manual valve mechanically interlocked with said manual shifting lever;
a vehicle speed sensor for generating an output signal representative of the vehicle speed;
automatic control means for receiving the output signal of the vehicle speed sensor and for generating a fluid pressure corresponding to the speed of the vehicle;
high-speed hydraulic servomechanism means for selectively engaging the friction coupling devices for establishing the high-speed drive mode;
low-speed hydraulic servomechanism means for selectively engaging the friction coupling devices for establishing the low-speed drive mode;
change-over hydraulic servomechanism means for selectively engaging the friction coupling devices for changing over between the two-wheel drive and the four-wheel drive;
an inhibitor valve;
a first fluid line providing direct fluid communication between said manual valve and said inhibitor valve;
wherein said manual valve has a first shift position for supplying hydraulic line pressure to only the inhibitor valve through said first fluid line, a second shift position for supplying said hydraulic line pressure both to the change-over hydraulic servomechanism means and to the inhibitor valve and a third shift position where hydraulic line pressure is supplied to only the change-over hydraulic servomechanism means and where said first fluid line is drained;

wherein said automatic control means includes:
a second fluid line connecting said inhibitor valve and said source of hydraulic line pressure;
a restrictor provided in said second fluid line;
a solenoid valve provided in said second fluid line, between the inhibitor valve and the restrictor, said solenoid valve draining the hydraulic pressure from said second fluid line when energized and allowing hydraulic line pressure to pass through said second fluid line when de-energized;
an electronic control unit which receives the input signal given by the vehicle speed sensor and generates an electrical output signal to energize the solenoid valve when the input signal corresponds to a vehicle speed lower than a predetermined value and to de-energize the solenoid valve when the input signal corresponds to a vehicle speed higher than a predetermined value;

and wherein said inhibitor valve includes:
a spool movable between a first valve position at which a low-speed drive mode is established and a second valve position at which a high-speed drive mode is established, and biasing means for urging the spool toward said first valve position, said spool being urged toward said second valve position by said hydraulic line pressure received through said manual valve when said manual valve is in said first or second shift positions, said spool being urged toward said first valve position by said biasing means when said manual valve is in said third shift position with said first fluid line drained;
a first chamber connected to said first fluid line to shift said spool to said second valve position against said biasing means responsive to receipt of hydraulic line pressure supplied through said first fluid line when said manual valve is shifted to said first or second shift positions;
an intermediate chamber which is connected to said second fluid line to shift said spool to said second valve position against said biasing means responsive to a hydraulic pressure received through said second fluid line corresponding to a vehicle speed higher than a predetermined value; and
a second chamber which is connected to said second fluid line when said spool is in said first valve position to maintain said spool in first valve position when said solenoid valve is de-energized thereby allowing hydraulic line pressure to be communicated through said second fluid line to said second chamber.

* * * * *